United States Patent
Douglas

(10) Patent No.: US 10,106,338 B2
(45) Date of Patent: Oct. 23, 2018

(54) MATERIAL SEPARATOR FOR A VERTICAL PNEUMATIC SYSTEM

(71) Applicant: Phillip Allan Douglas, Fredericktown, OH (US)

(72) Inventor: Phillip Allan Douglas, Fredericktown, OH (US)

( * ) Notice: Subject to any disclaimer, the term of this patent is extended or adjusted under 35 U.S.C. 154(b) by 64 days.

(21) Appl. No.: 13/999,396

(22) Filed: Feb. 21, 2014

(65) Prior Publication Data
US 2014/0301794 A1    Oct. 9, 2014

Related U.S. Application Data

(60) Provisional application No. 61/850,770, filed on Feb. 23, 2013.

(51) Int. Cl.
*B65G 53/60* (2006.01)

(52) U.S. Cl.
CPC .................... *B65G 53/60* (2013.01)

(58) Field of Classification Search
CPC ........ B65G 53/24; B65G 53/16; B65G 53/40; B65G 53/60; B65D 88/548; B65D 88/70; B65D 88/701; B65D 88/702; B65D 88/72
USPC .......... 406/163, 175; 110/310; 111/175, 176; 414/299
See application file for complete search history.

(56) References Cited

U.S. PATENT DOCUMENTS

| | | | |
|---|---|---|---|
| 521,619 A | 6/1894 | Jordan | |
| 666,113 A * | 1/1901 | Schwickart | F24C 3/002 110/297 |
| 956,393 A | 4/1910 | Mechling | |
| 1,380,698 A | 6/1921 | Anspach et al. | |
| 1,671,706 A | 5/1928 | Evans | |
| 1,861,295 A | 5/1932 | Bramwell | |
| 1,960,797 A * | 5/1934 | Sackett | B65G 69/10 222/464.1 |
| 2,003,159 A | 5/1935 | Taylor | |
| 2,010,128 A | 8/1935 | Arnold | |
| 2,371,152 A * | 3/1945 | Coates | A01M 25/00 406/155 |

(Continued)

FOREIGN PATENT DOCUMENTS

FR    1108436    1/1956

OTHER PUBLICATIONS

A. Bhatia, Pneumatic Conveying Systems, Course No. M05-010, no date, CED engineering.com.

*Primary Examiner* — Joseph A Dillon, Jr.
(74) *Attorney, Agent, or Firm* — Andrew C. Pike

(57) ABSTRACT

A delivery system deposits granular material being pneumatically conveyed within an entraining airflow to sequentially fill a storage silo from bottom to top. The delivery system has a series of vertical tubes and separators, vertically suspended and centered within the silo by a support, for conveying the entrained material upwardly from the bottom to the top of the silo. Each separator selectively separates the material from the airflow by choking the airflow entraining the material therewithin. Each separator automatically selects either to separate the entrained material therewithin and to deposit the separated material therefrom, or else to flow therethrough the entrained material without separation. The support has clamp assemblies, each having clamp halves and clamp brackets, wall brackets, and braces.

30 Claims, 5 Drawing Sheets

(56) References Cited

U.S. PATENT DOCUMENTS

| | | | | |
|---|---|---|---|---|
| 2,591,040 | A * | 4/1952 | Bartow | B65G 53/60 406/155 |
| 2,641,335 | A * | 6/1953 | Berg | B01D 45/02 137/171 |
| 2,643,161 | A | 6/1953 | Shirk | |
| 2,695,197 | A | 11/1954 | Burtis | |
| 2,697,640 | A | 12/1954 | Newman | |
| 2,704,229 | A | 3/1955 | Snow | |
| 2,717,181 | A * | 9/1955 | Snow | B65G 53/66 110/119 |
| 2,767,031 | A | 10/1956 | Huffman | |
| 2,813,757 | A * | 11/1957 | Shirk | B01J 8/0065 406/163 |
| 2,819,124 | A * | 1/1958 | Bergstrom | B01J 8/005 406/163 |
| 2,873,144 | A * | 2/1959 | Bergstrom | B01J 8/005 406/163 |
| 2,873,146 | A * | 2/1959 | Cross, Jr. | B01J 8/0065 406/163 |
| 2,873,147 | A * | 2/1959 | Payne | B01J 8/005 406/163 |
| 2,875,968 | A | 3/1959 | Ekola | |
| 2,880,037 | A * | 3/1959 | Drew | B01J 8/0025 406/163 |
| 2,880,038 | A * | 3/1959 | Bergstrom | B01J 8/005 406/163 |
| 2,887,341 | A * | 5/1959 | Cross, Jr. | B01J 8/0065 406/163 |
| 2,942,820 | A | 6/1960 | Sherbume | |
| 2,945,724 | A * | 7/1960 | McClure | B01J 8/005 406/163 |
| 3,083,064 | A | 3/1963 | McClure | |
| 3,115,370 | A * | 12/1963 | Cross, Jr. | B01J 8/0065 209/138 |
| 3,233,745 | A | 2/1966 | Hershberger | |
| 3,642,178 | A * | 2/1972 | Balzau | B01F 13/025 222/195 |
| 3,652,131 | A * | 3/1972 | Carlsson | B27N 3/14 222/330 |
| 3,799,621 | A * | 3/1974 | Kramer | B01J 8/44 406/163 |
| 3,854,637 | A * | 12/1974 | Muller, Jr. | B65G 69/0441 222/564 |
| 3,861,059 | A * | 1/1975 | Lindemann | F26B 17/102 209/140 |
| 3,874,860 | A * | 4/1975 | Larsson | B65G 53/62 209/10 |
| 4,082,364 | A | 4/1978 | Krambrock | |
| 4,240,772 | A * | 12/1980 | Wyatt | B65G 25/08 198/369.1 |
| 4,478,517 | A * | 10/1984 | Hoppe | B01F 5/243 222/459 |
| 4,603,769 | A | 8/1986 | Bach et al. | |
| 4,657,667 | A * | 4/1987 | Etkin | B07B 4/02 209/135 |
| 4,834,544 | A | 5/1989 | Paul | |
| 4,874,130 | A * | 10/1989 | Wondergem | A01C 15/04 239/63 |
| 4,978,227 | A | 12/1990 | Paul | |
| 4,995,966 | A * | 2/1991 | Ofner | B07B 1/20 209/240 |
| 5,101,847 | A * | 4/1992 | Oribe | F24F 7/06 137/1 |
| 5,163,786 | A | 11/1992 | Christianson | |
| 5,184,730 | A * | 2/1993 | Paul | B01F 13/0244 209/139.1 |
| 5,379,706 | A * | 1/1995 | Gage | A01C 15/04 111/174 |
| 5,584,615 | A | 12/1996 | Micklich | |
| 5,678,959 | A * | 10/1997 | Griffard | B65G 53/22 406/122 |
| 6,202,854 | B1 * | 3/2001 | Krieser | B07B 4/02 209/135 |
| 6,269,955 | B1 * | 8/2001 | Morimoto | B07B 11/06 209/139.1 |
| 6,632,063 | B1 | 10/2003 | Karlsen et al. | |
| 6,712,216 | B2 * | 3/2004 | Van Oirschot | B07B 7/04 209/138 |
| 6,845,867 | B2 * | 1/2005 | Sussegger | B07B 4/04 209/135 |
| 6,889,843 | B1 * | 5/2005 | Longhurst | B07B 9/02 209/135 |
| 6,892,748 | B2 * | 5/2005 | Junier | F16K 51/00 134/102.1 |
| 7,546,990 | B1 | 6/2009 | McGuire | |
| 7,588,061 | B2 * | 9/2009 | Poussin | B01J 8/002 141/286 |
| 7,712,611 | B2 * | 5/2010 | Longhurst | B07B 9/02 209/137 |
| 8,684,636 | B2 * | 4/2014 | Dunstan | A01C 7/081 111/175 |
| 8,690,488 | B2 * | 4/2014 | Jagow | A01C 7/082 111/175 |
| 8,821,078 | B2 * | 9/2014 | Hockett | B65G 47/684 111/175 |
| 8,876,439 | B2 * | 11/2014 | Sheehan | B01J 8/0015 198/534 |
| 2003/0077128 | A1 * | 4/2003 | Williams | B65G 53/16 406/173 |
| 2006/0255046 | A1 * | 11/2006 | Snowdon | B65D 88/128 220/563 |
| 2007/0228078 | A1 | 10/2007 | Sanders | |
| 2012/0042970 | A1 * | 2/2012 | Klages | F23J 7/00 137/561 A |
| 2013/0098480 | A1 * | 4/2013 | Chyou | F23J 15/025 137/561 A |
| 2013/0209182 | A1 * | 8/2013 | Sundholm | B65G 53/26 406/168 |
| 2013/0247803 | A1 * | 9/2013 | Heintzman | A01C 7/206 111/176 |
| 2013/0284644 | A1 * | 10/2013 | Baetz | B04C 5/12 209/143 |
| 2014/0202552 | A1 * | 7/2014 | Sixsmith | E03B 7/045 137/15.01 |
| 2015/0107502 | A1 * | 4/2015 | Riffel | A01C 7/084 111/175 |
| 2015/0344242 | A1 * | 12/2015 | Celella | B65G 53/26 414/171 |
| 2016/0264354 | A1 * | 9/2016 | Herman | B65D 88/548 |

* cited by examiner

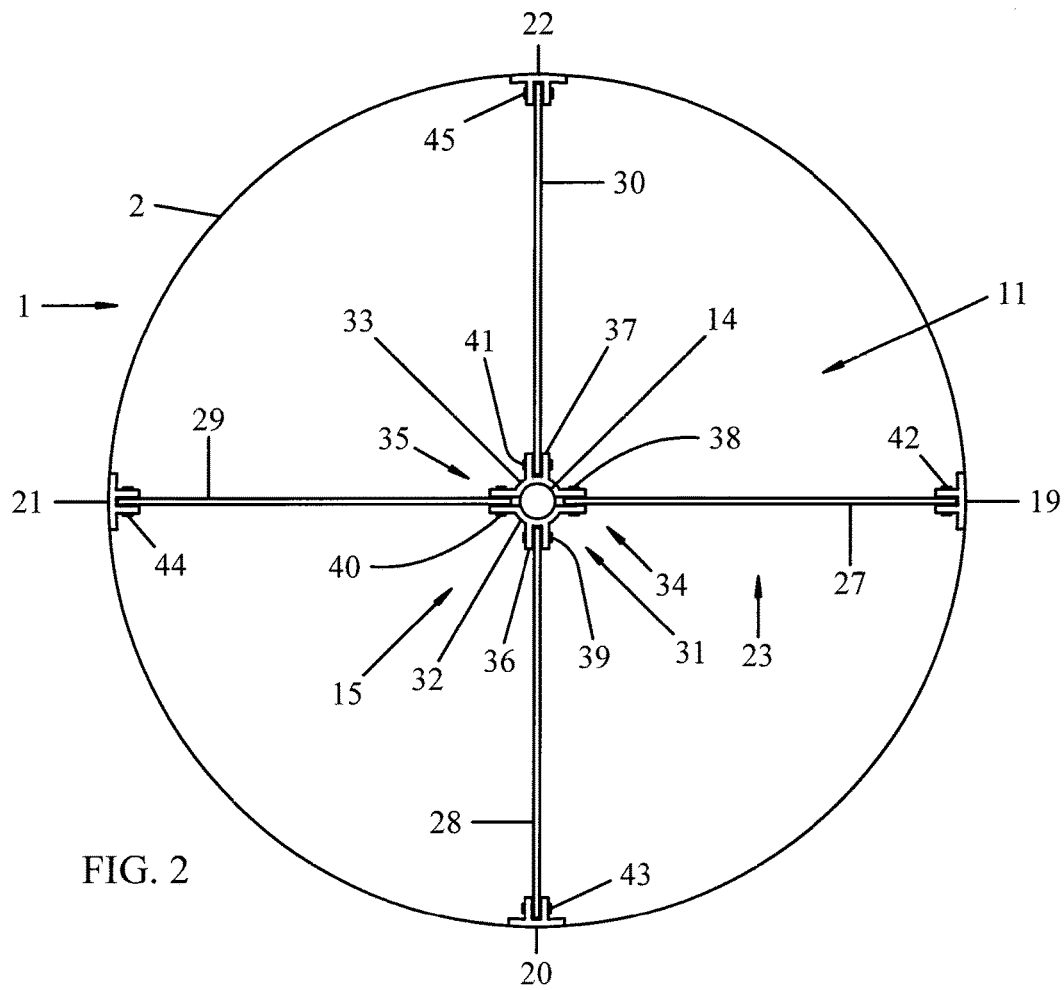
FIG. 2
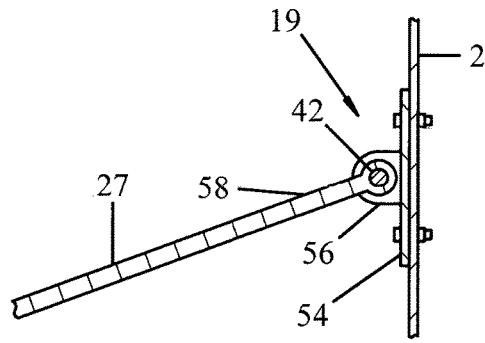
FIG. 10
FIG. 11

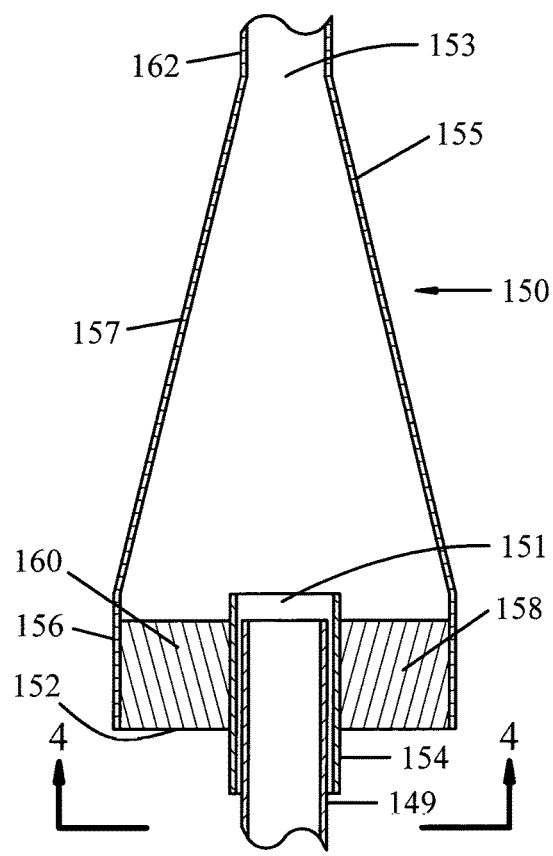
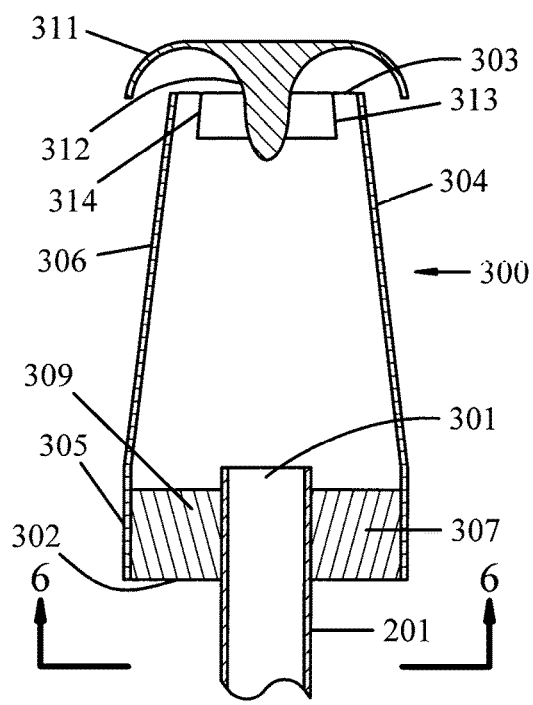

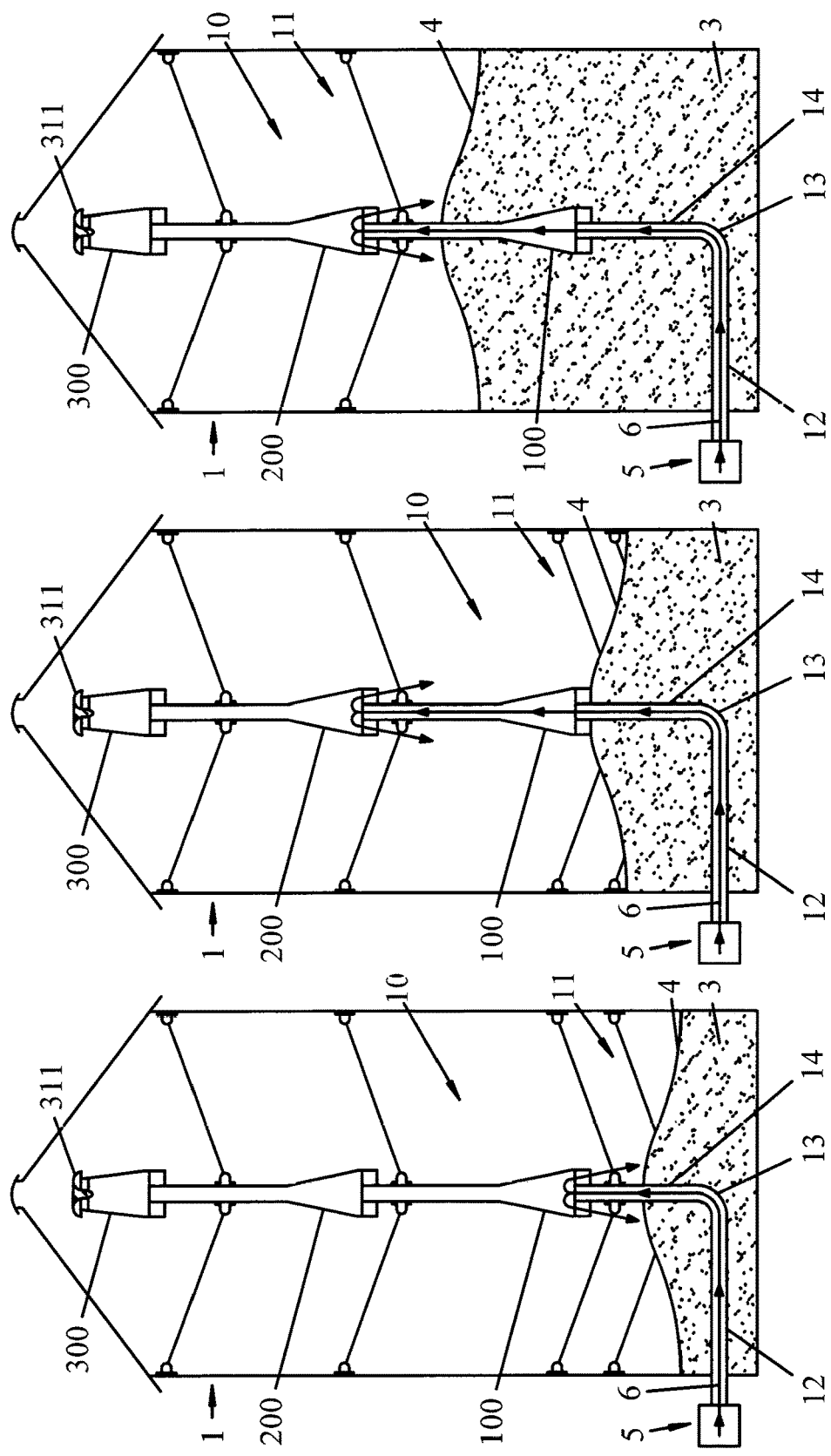

MATERIAL SEPARATOR FOR A VERTICAL PNEUMATIC SYSTEM

CROSS-REFERENCE TO RELATED APPLICATIONS

This application claims the benefit of provisional application No. 61/850,770 filed Feb. 23, 2013, which is incorporated by reference.

BACKGROUND OF THE INVENTION

Field of the Invention

The present invention relates to the delivery of material being transported by a conveyor entraining the material within a flow of fluid, and in particular to the depositing of granular material by a pneumatic conveyor into a storage silo.

Background Art

Fluid flow conveyors, particularly pneumatic conveyor systems; have become a popular alternative to augers and belt conveyors for the movement of granular materials. Pneumatic conveyor systems are especially suitable for farm grains for the following reasons: grain is carried within a stream of air for less grain damage; a pneumatic conveyor is more economical to install; a pneumatic conveyor is more versatile for multiple silos and multiple silo types at a storage facility; pneumatic conveyors are sealed against water and pest infiltration between receiving point to delivery of the grain; one pneumatic conveyor system can be utilized to move a variety of grain types without cross contamination, simply by turning a valve distributor between silos; and pneumatic conveyor systems are easier to maintain.

Prior art pneumatic conveyor systems delivering grain to the top of storage silos introduce problems for these systems: a cyclone separator is required for the top of each silo; the entire system is exterior of the silo, exposing the machinery to weather-related damage; supports that may be expensive must be used to support the pneumatic conveyor tubing; much of the pneumatic conveyor system is high above ground and not easily serviced; grain-to-grain damage occurs due to the falling of grain from the silo top to the bottom of the silo, which only increases with the height of the silo; and mixed granular materials experience product separation when dropped from the top of a silo.

Furthermore, an efficiency loss of approximately ten percent for every twenty-five feet (seven and one-half meters) of vertical rise is common to all pneumatic conveyor systems. For example, a pneumatic conveyor system used to fill a silo one hundred feet (thirty meters) tall would operate at 40% less than full efficiency (100 ft×(10%/25 ft)=40% loss; 30 m×(10%/7.5 m)=40% loss).

U.S. Pat. No. 4,082,364, Apr. 4, 1978, to Krambrock describes a method for sequentially filling silos.

U.S. Pat. No. 6,632,063, Oct. 14, 2003, to Karlsen et al. describes a system for reducing material separation in a top-filled silo.

U.S. Pat. No. 4,603,769, Aug. 5, 1986, to Bach et al. describes a vertical chute for reducing grain damage in a top-filled silo.

The article *Pneumatic Conveying Systems*, course No. M05-010, no date, by A. Bhatia of Continuing Education and Development, Inc. discusses pneumatic conveyors, and describes "choking" as a problem in vertically installed pneumatic tubing that is the settling out downwardly of the entrained material from the entraining airflow.

SUMMARY OF THE INVENTION

An objective of the present invention is to remove a major source of contamination into storage silos due to pneumatic conveyor systems by eliminating rooftop delivery of the material by the pneumatic conveyor.

Another objective is to reduce the expense of pneumatic conveyor systems by eliminating the components for rooftop delivery such as a cyclone separator and exterior supports for the pneumatic tubes.

Another objective is to increase the ease of maintenance of pneumatic conveyor systems by routing the pneumatic tubes connected to a storage silo near ground level.

Another objective is to protect the delivery system for a storage silo connected to a pneumatic conveyor from weather-related damage by locating and supporting the delivery system within the silo.

Another objective is to reduce grain-to-grain damage, and also product separation of mixed granular materials, by reducing the height through which the materials drop when deposited within a storage silo.

The system of the present invention delivers material being transported by a conveyor entraining the material within a flow of fluid. The system comprises a tube for receiving the fluid flow entraining the material, separators for selectively separating the material from the fluid flow, and a support for vertically suspending the system within a storage silo. The tube, the separators, and the support are all within the silo.

Each separator functions selectively in either one of two modes of operation: either separating the material from the fluid flow, or else flowing the fluid flow entraining the material through the separator without separating. Each separator comprises an inlet, means for separating the material from the fluid flow, a first outlet for depositing the material from the separating means, a second outlet, and a wall. Each separator also comprises means for selecting either to separate the material from the fluid flow by the separating means thereof and to deposit the material from the separating means thereof by the first outlet thereof or else to flow the fluid flow entraining the material through that separator through the second outlet thereof without separation of the material from the fluid flow within that separator. For each separator, the separator, the inlet, the first outlet, and the second outlet are coaxial.

The separating means comprises means for choking the fluid flow entraining the material within the separator thereof. The choking means comprises the tube and the separator being vertically oriented with the second outlet thereof being above the inlet and the first outlet thereof, and the wall thereof tapering upwardly.

The separating means for each separator comprises selectively separating means that selectively separates the material from the fluid flow within the separator thereof only when the selecting means thereof is selecting to separate and to deposit, depositing the separated material into the silo, creating a mound of the separated material having a surface. The material flows through the first outlet of that separator until the mound surface blocks the first outlet thereof, stopping the flowing and thus stopping the selectively separating of the separator thereof so that the selecting means thereof automatically is selecting to flow. The fluid flow entraining the material is thus reestablished to go through that separator without separating the material.

The support suspends the system vertically within the silo from bottom to top, wherein the next separator that is downstream is located above the preceding separator that is upstream thereof, respectively. The support comprises clamp assemblies, a set of braces for each respective clamp assembly, and wall brackets connected to the respective braces for connecting to a wall of the storage silo. Each clamp assembly comprises two equal halves each having two ends and an outer side, a flange for each end wherein the flanges of adjacent ends form end brackets, at least one bracket for each side, and connectors connecting the brackets to the braces, respectively.

The method of the present invention comprises flowing the fluid flow entraining the material into a separator, separating the material from the fluid flow within the separator, and depositing the separated material out of the separator. The separating comprises choking the fluid flow entraining the material within the separator. The depositing forms a mound of the material. The method further comprises selecting either to separate the material from the fluid flow by the separating and to deposit the material from the separating by the depositing or else to flow the fluid flow entraining the material through the separator through the second outlet thereof without separation of the material from the fluid flow within the separator. The separating comprises selectively separating the material from the fluid flow within the separator only when the selecting is selecting to separate and to deposit. The method further comprises, only when the selecting is selecting to flow, stopping the selectively separating and the depositing by the selecting to be selecting to flow, reestablishing the fluid flow entraining the material through the separator without separation of the material from the fluid flow within the separator, flowing the fluid flow entraining the material into a downstream separator that is downstream of the separator, separating the material from the fluid flow within the downstream separator, and depositing that separated material out of the downstream separator onto the mound of the material.

Thus, the present invention automatically sequentially fills a storage silo as initially an upstream separator selectively separates the material onto the mound of separated material that is being formed within the silo until the surface of the mound blocks the first outlet thereof and stops the selectively separating of that upstream separator, and then subsequently a separator that is downstream of that upstream separator selectively separates the material onto the mound, and so continues for all of the separators until the silo is filled.

The present invention reduces the average drop height of the separated material. This reduces grain-to-grain damage and also product separation of mixed granular materials. The reduction in average drop height of the separated material also increases the efficiency of the pneumatic conveyor system. Whereas a prior art pneumatic conveyor system having rooftop delivery of the material typically would have, for example, for a one-hundred-foot (thirty-meter) high silo a 40% loss of efficiency (as hereinbefore stated), the present invention with four separators bottom to top for the same silo would have a calculated loss of only 25% ((10%+20%+30%+40%)/4)=25%). This is an increase of delivery efficiency by fifteen percentage points, or 25% (((100%−25%)−(100%−40%))/(100%−40%)=125%).

An additional advantage of the present invention over the prior art is the simplicity of operation, with the separators acting automatically and with no moving parts being required for the delivery system.

BRIEF DESCRIPTION OF THE DRAWINGS

FIG. 2 is a schematic bottom view of the embodiment of the present invention, as shown in FIG. 1, showing a clamp assembly.

FIG. 3 is a cross-sectional view, partly broken, taken on line 3-3 in FIG. 4 of one embodiment of a separator that is not a top separator.

FIG. 4 is a cross-sectional view taken on line 4-4 in FIG. 3.

FIG. 5 is a cross-sectional view, partly broken, taken on line 5-5 in FIG. 6 of one embodiment of a top separator.

FIG. 6 is a cross-sectional view taken on line 6-6 in FIG. 5.

FIG. 10 is a front view, partly broken, of one embodiment of a wall bracket and a brace of the support of the present invention.

FIG. 11 is a cross-sectional view, partly broken, taken on line 11-11 in FIG. 10.

FIG. 12 is a schematic view of the embodiment of the present invention, as shown in FIG. 1, showing the upstream separator separating the material from the airflow during the sequential filling of the silo.

FIG. 13 is a schematic view of the sequential filling of the silo, as shown in FIG. 12, showing the upstream separator stopping the separation thereof and reestablishing the flowing of the airflow entraining the material therethrough, without separating, onto the downstream separator for separating the material.

FIG. 14 is a schematic view of the sequential filling of the silo, as shown in FIG. 13, showing the downstream separator separating the material from the airflow onto the material that had been separated by the upstream separator.

DETAILED DESCRIPTION OF THE INVENTION

Figure 1:
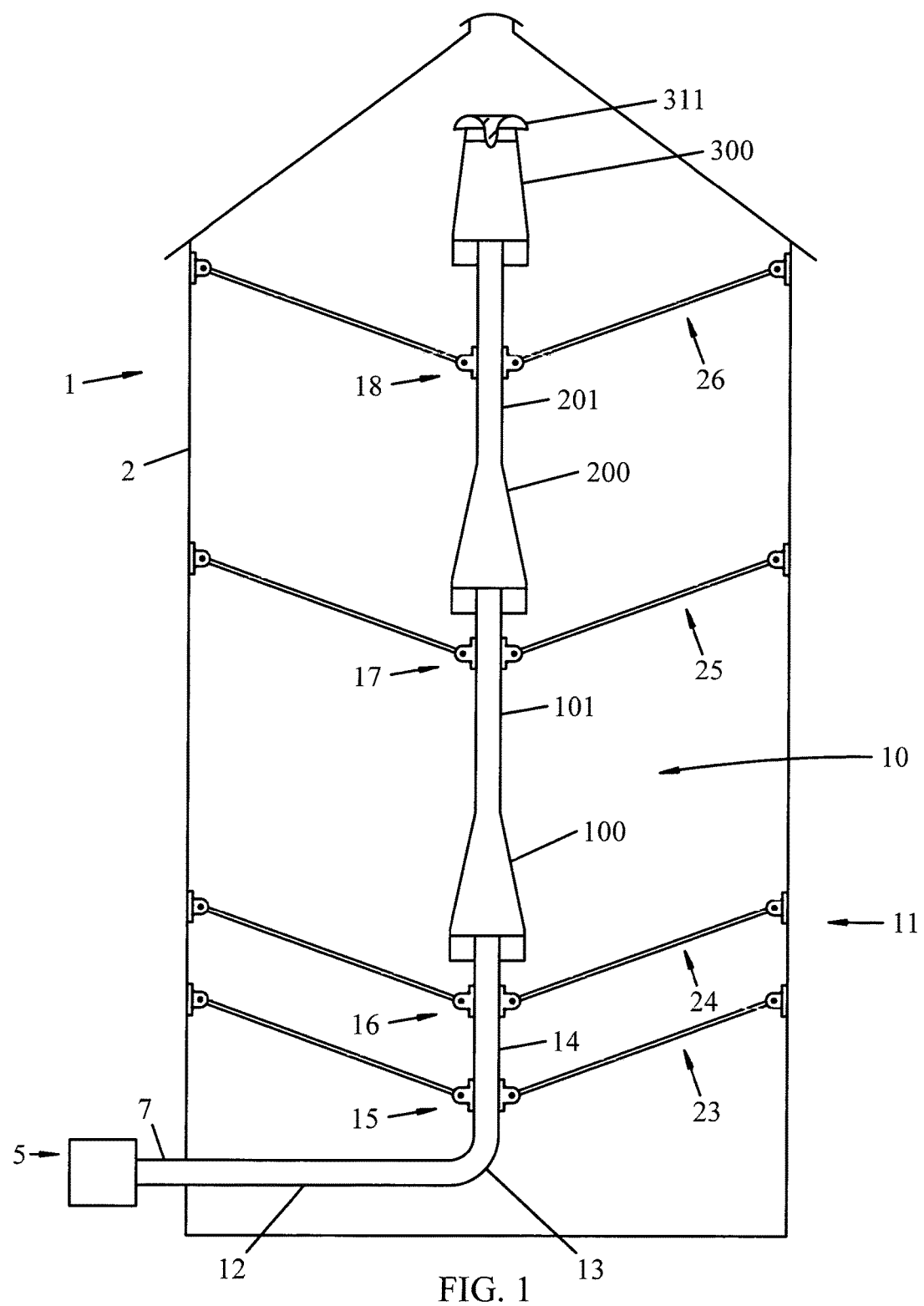
FIG. 1 is a schematic side view of one embodiment of the present invention supported within a storage silo comprising an upstream separator, a downstream separator, a top separator, and four clamp assemblies.

The present invention is vertically supported within a vertical storage silo 1 having a wall 2 as shown schematically in FIG. 1. The silo 1 is for the storage of granular material 3, for example grain, that, when so stored, has a material surface 4 as shown in FIG. 12, FIG. 13, and FIG. 14. Although the present invention is contemplated primarily for grain, the intent of the claimed invention is to be construed to include all manner of granular material. Pelletized food products, fuels, coal, animal feeds, plastics, and fiber products are a few of the other items suitable for pneumatic conveying for storage.

The present invention delivers the material 3 to the silo 1 when the material is transported by a conveyor entraining the material within a flow of fluid. One embodiment of the present invention is contemplated to be used with a conventional pneumatic conveyor system that entrains the material within a flow of air for depositing the material 3 into the silo 1.

A conventional pneumatic charging system is shown generally in FIG. 1 as prior art pneumatic conveyor 5. Typically, a blower (not shown) supplies a flow of air to a rotary airlock (not shown). The rotary airlock entrains the material 3 to be conveyed into the airflow creating a pneumatic material flow 6 that is a mixture of the airflow entraining the conveyed material to be propelled toward the silo 1. The pneumatic conveyor 5 connects to a tube 7 for conveying of the pneumatic material flow 6. The tube 7 is a pneumatic transfer tube of prior art.

One embodiment of the present invention is shown schematically in FIG. 1 and FIG. 2 as, generally, a delivery system 10. The delivery system 10 comprises a series of tubes and separators within the silo 1. A support 11 of the delivery system 10 suspends and centers the delivery system 10 within the silo 1. The tube 7 connects to a horizontal tube 12 of the delivery system 10 for conveying the pneumatic material flow 6 into the silo 1. The horizontal tube 12 enters the silo 1 through a lower portion of the silo wall 2. An elbow 13 interconnects the horizontal tube 12 and a vertical tube 14 for conveying the pneumatic material flow 6 upwardly within the silo 1. The vertical tube 14 is located at and along the vertical center of the silo 1 as shown in FIG. 2. A clamp assembly 15 of the support 11 is positioned on the vertical tube 14 near the elbow 13.

The support 11 includes a plurality of clamp assemblies, and in particular, for the embodiment shown in FIG. 1, the clamp assembly 15 and also clamp assemblies 16, 17, and 18. As shown in FIG. 2, the support 11 further includes wall brackets 19, 20, 21, and 22 on the silo wall 2, and a set 23 of braces 27, 28, 29, and 30 interconnecting the clamp assembly 15 with the wall brackets 19, 20, 21, and 22 on the silo wall 2, respectively, thereby suspending and centering the vertical tube 14 within the silo 1. Sets 24, 25, and 26 of braces also interconnect the clamp assemblies 16, 17, and 18, respectively, with wall brackets.

The clamp assembly 15 includes a clamp 31. As shown schematically in FIG. 2, clamp 31 has two equal half clamps 32 and 33 mounted on and clamping around the vertical tube 14. The clamp 31 has end brackets 34 and 35, each at adjacent ends of the half clamps 32 and 33, and one or more side brackets 36 and 37 on each side of the half clamps 32 and 33.

The braces 27, 28, 29, and 30 are evenly spaced around the vertical tube 14; and are connected at one end thereof to the end bracket 34, the side bracket 36, the end bracket 35, and the side bracket 37, respectively, by fasteners or bolts 38, 39, 40, and 41, respectively, as connectors. The wall brackets 19, 20, 21, and 22 are evenly spaced on, and connected to, the inner surface of the silo wall 2 on a horizontal plane above the height of the clamp assembly 15. Opposite ends of the braces 27, 28, 29, and 30 are connected to the wall brackets 19, 20, 21, and 22, respectively, by fasteners or bolts 42, 43, 44, and 45, respectively, thereby equally connecting the brackets of the clamp 31 to the silo wall 2. The braces 27, 28, 29, and 30 each has a length equal to or greater than the radius of the silo 1, and extend radially upwardly and outwardly from the clamp assembly 15 to the wall brackets 19, 20, 21, and 22.

The vertical tube 14 slips into an upstream separator 100 of the delivery system 10. The clamp assembly 16 of the support 11 is positioned, in the embodiment shown in FIG. 1, on the vertical tube 14 near the upstream separator 100 for suspending and centering the vertical tube 14 within the silo 1. The upstream separator 100 comprises a vertical tube 101 for conveying the pneumatic material flow 6 upwardly from the upstream separator 100. The upstream separator 100 selectively either separates the material from the airflow and deposits the separated material 3 into the silo 1; or else flows the pneumatic material flow 6 through the upstream separator 100, without separating the material from the airflow, and into the vertical tube 101.

In the embodiment shown in FIG. 1, the vertical tube 101 slips into a downstream separator 200 of the delivery system 10 that is vertically above the upstream separator 100 and downstream of the upstream separator 100. The clamp assembly 17 of the support 11 is positioned on the vertical tube 101 near the downstream separator 200 for suspending and centering the vertical tube 101 and the upstream separator 100 within the silo 1. The downstream separator 200 comprises a vertical tube 201 for conveying the pneumatic material flow 6 upwardly from the downstream separator 200. The downstream separator 200 selectively either separates the material from the airflow and deposits the separated material 3 into the silo 1 onto the separated material 3 deposited by the upstream separator 100; or else flows the pneumatic material flow 6 through the downstream separator 200, without separating the material from the airflow, and into the vertical tube 201.

The vertical tube 201, in the embodiment shown in FIG. 1, connects to a top separator 300 of the delivery system 10 that is vertically above both the upstream separator 100 and the downstream separator 200 and that is downstream of the downstream separator 200. The clamp assembly 18 of the support 11 is positioned on the vertical tube 201 for suspending and centering the vertical tube 201 and the downstream separator 200 within the silo 1. The top separator 300 comprises an open cap 311 on the top of the top separator 300. The top separator 300 selectively either separates the material from the airflow and deposits the separated material 3 into the silo 1 onto the separated material 3 deposited by both the upstream separator 100 and the downstream separator 200; or else flows the pneumatic material flow 6 through the top separator 300, without separating the material from the airflow, toward the cap 311.

One embodiment of a material separator 150 of the present invention that is not a top separator, that, for the embodiment shown in FIG. 1, can be any separator of the delivery system 10 that is not the top separator 300, is shown in FIG. 3 and FIG. 4. A vertical tube 149 conveys the pneumatic material flow 6 upwardly, from upstream of the material separator 150, downstream into the material separator 150. For the embodiment shown in FIG. 1, the vertical tube 149 can be any of the vertical tube 14 or the vertical tube that any of the separators of the delivery system 10, that is not the top separator 300, comprises.

The material separator 150 has an inlet 151, a first outlet 152 below the inlet 151, and a second outlet 153 above the inlet 151. The material separator 150 includes an inlet tube 154 forming the inlet 151 at the upper end of the inlet tube 154. The lower end of the inlet tube 154 is below the first outlet 152. The inside diameter of the inlet tube 154 is greater than the outside diameter of the vertical tube 149. The vertical tube 149 thus slips into the inlet tube 154 of the material separator 150.

The material separator 150 has a metal wall 155 interconnecting the first outlet 152 and the second outlet 153. The wall 155 forms a cylindrical base 156 and a forcing cone 157 above the cylindrical base 156. The inside diameter of the cylindrical base 156 is greater than the outside diameter of the inlet tube 154, forming the first outlet 152 at the lower end of the cylindrical base 156. A plurality of webs 158, 159, 160, and 161 in the first outlet 152 structurally interconnect and space apart the cylindrical base 156 of the wall 155 and the inlet tube 154. The forcing cone 157 tapers upwardly and inwardly from the cylindrical base 156 to a cylindrical outlet tube 162, forming the second outlet 153 at the upper end of the forcing cone 157. The outlet tube 162 has the same outside diameter as the outside diameter of the vertical tube 149. For the embodiment shown in FIG. 1, the outlet tube 162 can be any of the vertical tube that any of the separators of the delivery system 10, that is not the top separator 300, comprises.

The material separator 150, the inlet 151, the first outlet 152, and the second outlet 153 are coaxial. The cylindrical base 156 has an inside diameter about three times the outside diameter of the inlet tube 154. The overall height of the material separator 150 is approximately six times the diameter of the inlet 151.

The material separator 150 separates the material 3 from the airflow by choking the pneumatic material flow 6, that is the airflow entraining the material, flowing upwardly within the material separator 150 for settling out downwardly the material from the entraining airflow. The material separator 150 is vertically oriented for the choking of the pneumatic material flow 6 to separate the material 3 from the airflow within the material separator 150. The vertical tube 149 is also so vertically oriented. The material separator 150 is vertically oriented such that the second outlet 153 is above the inlet 151 and above the first outlet 152. The tapering upwardly and inwardly of the forcing cone 157 also chokes the pneumatic material flow 6 to separate the material 3 from the airflow within the material separator 150.

One embodiment of the top separator 300 of the present invention is shown in FIG. 5 and FIG. 6. A vertical tube 201 conveys the pneumatic material flow 6 upwardly, from upstream of the top separator 300, downstream into the top separator 300. The vertical tube 201 shown in FIG. 5 and FIG. 6 conveys the pneumatic material flow 6 from the uppermost material separator 150 of the delivery system 10 that is not the top separator 300. For the embodiment shown in FIG. 1, the vertical tube 201 shown in FIG. 5 and FIG. 6 is the vertical tube 201 shown in FIG. 1 that the downstream separator 200 (which is the uppermost separator that is not the top separator 300) of the delivery system 10 comprises.

The top separator 300 has an inlet 301, a first outlet 302 below the inlet 301, and a second outlet 303 above the inlet 301. The vertical tube 201 extends into and terminates within the top separator 300 forming the inlet 301 at the upper end of the vertical tube 201.

The top separator 300 has a metal wall 304 interconnecting the first outlet 302 and the second outlet 303. The wall 304 forms a cylindrical base 305 and a cone 306 above the cylindrical base 305. The inside diameter of the cylindrical base 305 is greater than the outside diameter of the vertical tube 201, forming the first outlet 302 at the lower end of the cylindrical base 305. A plurality of webs 307, 308, 309, and 310 in the first outlet 302 structurally interconnect and space apart the cylindrical base 305 of the wall 304 and the vertical tube 201. The cone 306 tapers upwardly and inwardly from the cylindrical base 305 to a diameter about two times the diameter of the inlet 301 at the second outlet 303, forming the second outlet 303 at the upper end of the cone 306.

An open cap 311 is at the second outlet 303 and has a stem 312. A plurality of webs 313, 314, 315, and 316 interconnect and space apart the stem 312 of the open cap 311 and the cone 306 of the wall 304 at the second outlet 303, centering the stem 312 into the second outlet 303. The webs 313, 314, 315, and 316 are in the second outlet 303 interiorly of the wall 304. The open cap 311 is mushroom shaped, blocking continued vertical flow, and redirects any flow through the second outlet 303 downwardly and out of the top separator 300.

The top separator 300, the inlet 301, the first outlet 302, and the second outlet 303 are coaxial. The cylindrical base 305 has an inside diameter about three times the outside diameter of the vertical tube 201. The overall height of the top separator 300 is about six times the diameter of the inlet 301.

The top separator 300 separates the material 3 from the airflow by choking the pneumatic material flow 6, that is the airflow entraining the material, flowing upwardly within the top separator 300 for settling out downwardly the material from the entraining airflow. The top separator 300 is vertically oriented for the choking of the pneumatic material flow 6 to separate the material 3 from the airflow within the top separator 300. The vertical tube 201 is also so vertically oriented. The top separator 300 is vertically oriented such that the second outlet 303 is above the inlet 301 and above the first outlet 302. The tapering upwardly and inwardly of the cone 306 also chokes the pneumatic material flow 6 to separate the material 3 from the airflow within the top separator 300.

Figure 7:
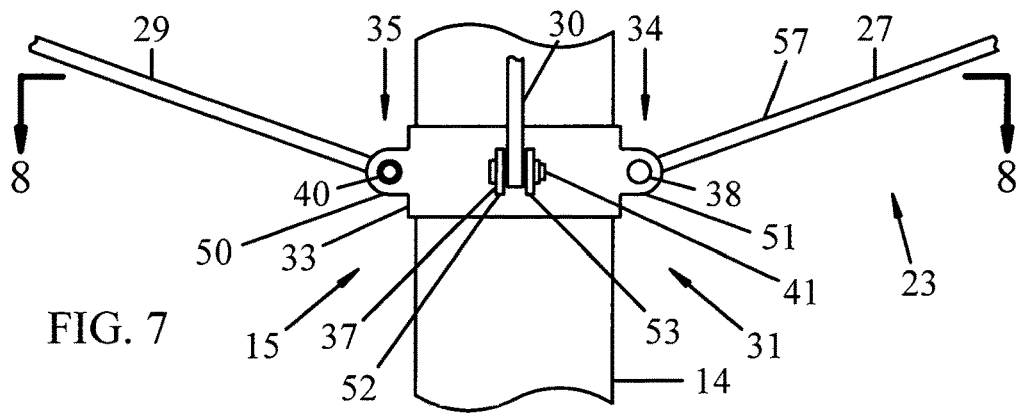
FIG. 7 is a side view, partly broken, of one embodiment of a clamp assembly and braces of the support of the present invention.

The clamp assemblies of the support 11 are identical with each other; and, as such, the clamp assembly 15 is typical. The clamp assembly 15 is shown in greater detail in FIG. 7, FIG. 8, and FIG. 9.

The clamp 31 of the clamp assembly 15 has an inside circumference less than the outside circumference of the vertical tube 14. The clamp 31 is composed of metal plate or metal casting. The clamp 31 is a union of the two equal half clamps 32 and 33.

The half clamp 32 has an outward radiating end flange 46 on one end for forming the end bracket 34, and an outward radiating end flange 47 on the other end for forming the end bracket 35. The half clamp 32 has one or more of the side brackets 36 evenly spaced between the ends of the half clamp 32. Each side bracket 36 has two flanges 48 and 49 closely spaced to, and parallel with, each other. Each side bracket 36 has one aligning through hole formed by aligned holes in the flanges 48 and 49 thereof.

The half clamp 33 has an outward radiating end flange 50 on one end for forming the end bracket 35, and an outward radiating end flange 51 on the other end for forming the end bracket 34. The half clamp 33 has one or more of the side brackets 37 evenly spaced between the ends of the half clamp 33. Each side bracket 37 has two flanges 52 and 53 closely spaced to, and parallel with, each other. Each side bracket 37 has one aligning through hole formed by aligned holes in the flanges 52 and 53 thereof.

Figure 8:
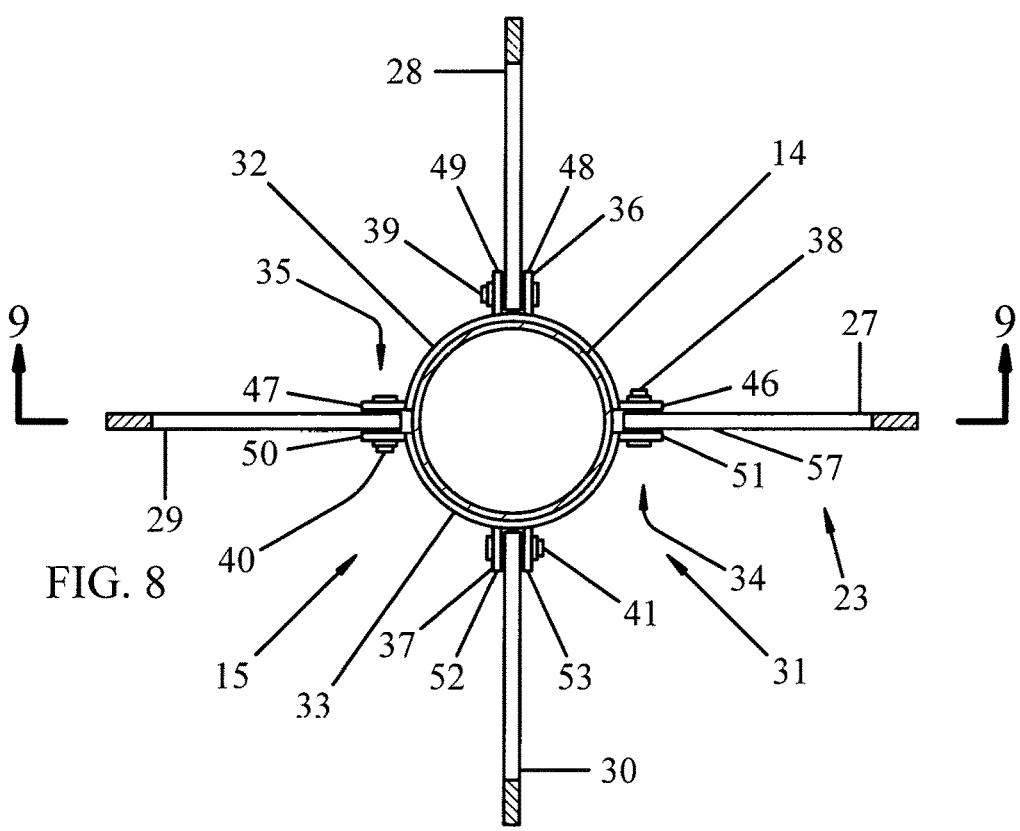
FIG. 8 is a cross-sectional view taken on line 8-8 in FIG. 7.
Figure 9:
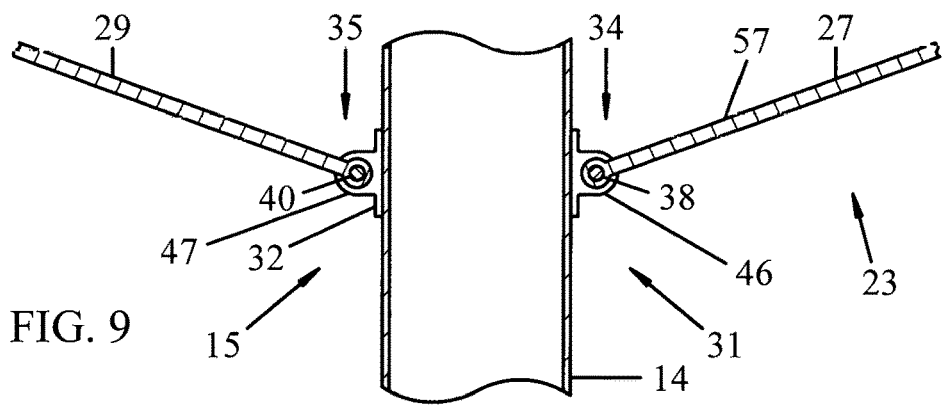
FIG. 9 is a cross-sectional view, partly broken, taken on line 9-9 in FIG. 8.

When the half clamps 32 and 33 are mounted onto the vertical tube 14, as shown in FIG. 8, the end flange 46 of the half clamp 32 and the end flange 51 of the half clamp 33 are adjacent to each other, forming the end bracket 34; and the end flange 47 of the half clamp 32 and the end flange 50 of the half clamp 33 are adjacent to each other, forming the end bracket 35. An aligning through hole of the end bracket 34 is formed by aligned holes in the end flanges 46 and 51, respectively. An aligning through hole of the end bracket 35 is formed by aligned holes in the end flanges 47 and 50, respectively.

The wall brackets of the support 11 are identical with each other; and the wall bracket 19, as typical thereof, is shown in greater detail in FIG. 10 and FIG. 11. The wall bracket 19 is a metal or metal casting fixture. The wall bracket 19 has a base 54 and two parallel flanges 55 and 56. Each of the flanges 55 and 56 have aligned holes, forming an aligning through hole. The base 54 of the wall bracket 19 has two or more holes. The wall bracket 19 is mechanically fastened or bolted to the silo wall 2.

The sets of the braces of the support 11 are identical with each other. The brace 27, being typical of the braces, is shown in greater detail in FIG. 7 through FIG. 11. The brace 27 is a metal rod or cable having two end holes, one each for the inner end 57 and the outer end 58 thereof, for receiving the fasteners or bolts 38 and 42. The clamp end bracket 34 receives the inner end 57 of the brace 27 and retains the inner end 57 therein by the bolt 38 passing through the aligning through hole of the clamp end bracket 34 and the inner end hole of the brace 27. The wall bracket 19 receives the outer end 58 of the brace 27 and retains the outer end 58 therein by the bolt 42 passing through the aligning through hole of the wall bracket 19 and the outer end hole of the brace 27.

Operation

In operation, the delivery system 10 of the present invention automatically sequentially fills the storage silo 1, as shown in FIG. 12, FIG. 13, and FIG. 14, with the material 3 when the material is transported to the silo 1 by a conveyor entraining the material within a flow of fluid. In the embodiment of the present invention shown in FIG. 1, that is also shown in FIG. 12, FIG. 13, and FIG. 14, that conveyor is the conventional pneumatic conveyor 5 that entrains the material within a flow of air for depositing the material 3 into the silo 1.

As the pneumatic conveyor 5 begins to convey the pneumatic material flow 6 into the delivery system 10, filling of the storage silo 1 commences. The horizontal tube 12 of the delivery system 10 receives the pneumatic material flow 6 from the pneumatic conveyor 5 and conveys the pneumatic material flow 6 into the silo 1. The elbow 13 directs the pneumatic material flow 6 from the horizontal tube 12 vertically into the vertical tube 14 that conveys the pneumatic material flow 6 upwardly and downstream within the silo 1.

The vertical tube 14 conveys the pneumatic material flow 6 upwardly and downstream into the vertically oriented first material separator 150 of the delivery system 10, which in the embodiment shown in FIG. 12 is the upstream separator 100, by flowing the pneumatic material flow 6 upwardly through the inlet 151. The pneumatic material flow 6 expands from the inlet tube 154 into the increased diametric volume of the forcing cone 157 within the vertically oriented material separator 150. Insufficient air pressure results in a choking action within the material separator 150, separating the material 3 from the airflow. A flow of the separated material 3 is automatically deposited downwardly by gravity out of the material separator 150 through the first outlet 152 and into the silo 1, forming a mound of the separated material 3 having a material surface 4. The airflow is rapidly released upwardly through the second outlet 153 and also downwardly through the first outlet 152.

As the material separator 150, specifically the upstream separator 100, continues to separate the material 3 and to deposit the separated material 3 through the first outlet 152 onto the mound thereof within the silo 1, the flow of the separated material 3 raises the level of the material surface 4 within the silo 1 to eventually meet with and block the first outlet 152 as shown in FIG. 13. This blocking of the first outlet 152 automatically stops the flow of the separated material 3 being deposited out of the material separator 150 through the first outlet 152 into the silo 1 and thus stops the separating of the material from the airflow within the material separator 150. The pneumatic material flow 6 is reestablished within the material separator 150 to flow through the second outlet 153 without separation of the material from the airflow within the material separator 150.

The outlet tube 162, which in the embodiment shown in FIG. 1 is the vertical tube 101, conveys the reestablished pneumatic material flow 6 from the second outlet 153 upwardly and downstream into the material separator 150 of the delivery system 10 that is the next material separator 150 that is downstream of the first material separator 150. In the embodiment shown in FIG. 13, that next material separator 150 is the downstream separator 200. The downstream separator 200, which is that next material separator 150, then separates the material 3 from the airflow in the identical operation as that of the previous material separator 150 (the upstream separator 100 in the embodiment shown in FIG. 12). As shown in FIG. 14, the flow of the separated material 3 is deposited out of the downstream separator 200 onto the mound of the material 3 that had been deposited out of the upstream separator 100, the separated material 3 falling at most only as far as the previous material separator 150 (the upstream separator 100 in the embodiment shown in FIG. 13), again raising the level of the material surface 4.

This operation of separating the material, flowing the separated material, depositing the separated material, then stopping the flowing and the depositing of the separated material by blocking the first outlet, and then reestablishing the pneumatic material flow 6 to convey upwardly the pneumatic material flow 6 into the next material separator 150 that is downstream is repeated for each of the material separators 150 of the delivery system 10 in sequence, initially for a respective upstream separator and subsequently for a respective downstream separator that also is the next respective upstream separator, from the bottom of the silo 1 to the top of the silo 1. The final separator in this sequence is the top separator 300, which operates similarly as all the other material separators 150 operate. The cap 311 redirects any flow through the second outlet 303 of the top separator 300 downwardly and out of the top separator 300 into the silo 1.

Thus, for each separator, the separator functions selectively in either one of two modes of operation. In one mode of operation, the separator separates the material from the airflow entraining the material within the separator and deposits the separated material out of the separator by flowing the separated material through the first outlet thereof. In another mode of operation, the airflow entraining the material flows through the separator and through the second outlet thereof without separating the material therefrom and without depositing separated material by flowing separated material through the first outlet thereof. The separator selectively separates the material from the airflow only in the mode of operation that separates and deposits. The selecting between the two modes of operation is automatic, based on whether the surface of the mound of the deposited material does or does not block the first outlet of the separator through which the separated material is deposited onto the mound. The selectively separating, and the selecting of either the mode of operation that separates the material from the airflow by the separating and deposits the separated material by the depositing or else the mode of operation that flows the airflow entraining the material through the separator through the second outlet thereof without separation of the material from the airflow within the separator requires no moving parts. Thus, for each separator, the separator selectively separates the material and deposits the separated material into the silo to sequentially fill the silo up to the height that the separator is located within the silo.

Further, the support 11 has a plurality of the clamp assemblies to suspend and center the series of the tubes and the separators of the delivery system 10. The clamp assemblies are structurally attached to the silo wall 2 through a plurality of brackets to distribute pressure. The distribution of the wall brackets throughout the silo 1 provides even weight transfer to the silo wall 2. The two equal half clamps of the clamps of the clamp assemblies simplify construction. The clamps of the clamp assemblies provide for even load transfer and stabilization through the application of opposing clamp brackets.

Suspension of the delivery system 10 of the present invention within the silo 1 provides an unobstructed floor area for mechanical sweeping.

It is also possible to charge the delivery system 10 of the present invention through the silo floor as an alternative to through the silo wall 2.

This description of the present invention is not intended to be limited to only metal materials. Plastic and rubber may also be substituted for any or all parts. The present invention also lends itself to colorful displays including confectioneries through the use of clear glass or clear plastic materials.

I claim:

1. A method of delivering material being transported by a conveyor entraining the material within a flow of fluid, wherein said method comprises:
    flowing the fluid flow entraining the material into a separator, comprising an inlet, a first outlet, and a second outlet, through the inlet of the separator;
    separating the material from the fluid flow within the separator;
    depositing the material from said separating out of the separator through the first outlet; and
    selecting either to separate the material from the fluid flow by said separating and to deposit the material from said separating by said depositing or else to flow the fluid flow entraining the material through the separator through the second outlet without separation of the material from the fluid flow within the separator;
    wherein said separating comprises selectively separating the material from the fluid flow within the separator only when said selecting is selecting to separate and to deposit.

2. The method of claim 1, wherein said selecting comprises automatically selecting either to separate the material from the fluid flow by said selectively separating and to deposit the material from said selectively separating by said depositing or else to flow the fluid flow entraining the material through the separator through the second outlet without separation of the material from the fluid flow within the separator; and
    wherein said automatically selecting comprises said depositing comprising flowing the material from said selectively separating out of the separator through the first outlet, forming a mound of the material having a surface so that said automatically selecting is selecting to separate and to deposit, only until the surface of the mound blocks the first outlet so that said automatically selecting is selecting to flow.

3. The method of claim 1, wherein said selectively separating comprises choking the fluid flow entraining the material within the separator to separate the material from the fluid flow within the separator.

4. The method of claim 1, wherein said flowing comprises orienting the fluid flow entraining the material vertically upwardly into the separator at the inlet.

5. A system for delivering material being transported by a conveyor entraining the material within a flow of fluid, wherein said system comprises:
    a separator; and
    a tube for receiving the fluid flow entraining the material and for conveying the fluid flow entraining the material to said separator;
    wherein said separator comprises:
        an inlet for the fluid flow entraining the material from said tube,
        means for separating the material from the fluid flow within said separator,
        means for depositing the material from said separating means out of said separator wherein said depositing means comprises a first outlet,
        a second outlet, and
        means for selecting either to separate the material from the fluid flow by said separating means and to deposit the material from said separating means by said depositing means or else to flow the fluid flow entraining the material through said separator through said second outlet without separation of the material from the fluid flow within said separator; and
    wherein said separating means comprises means for selectively separating the material from the fluid flow within said separator only when said selecting means is selecting to separate and to deposit.

6. The system of claim 5, wherein said selecting means comprises means for automatically selecting either to separate the material from the fluid flow by said selectively separating means and to deposit the material from said selectively separating means by said depositing means or else to flow the fluid flow entraining the material through said separator through said second outlet without separation of the material from the fluid flow within said separator; and
    wherein said automatically selecting means comprises said first outlet through which the material from said selectively separating means flows out of said separator, forming a mound of the material having a surface so that said automatically selecting means is selecting to separate and to deposit, only until the surface of the mound blocks said first outlet so that said automatically selecting means is selecting to flow.

7. The system of claim 5, wherein said selectively separating means comprises means for choking the fluid flow entraining the material within said separator to separate the material from the fluid flow within said separator.

8. The system of claim 7, wherein said choking means comprises said separator being vertically oriented with said second outlet being above said inlet and above said depositing means.

9. The system of claim 8, wherein said selecting means comprises said first outlet through which the material from said selectively separating means flows out of said separator;
    wherein said inlet is above said first outlet;
    wherein said inlet and said second outlet each has a diameter; and
    wherein said first outlet has a diameter greater than the diameters of said inlet and of said second outlet.

10. The system of claim 7, wherein said choking means comprises said tube and said separator being vertically oriented with said second outlet being above said inlet and above said depositing means.

11. The system of claim 7, wherein said separator further comprises a wall, and said choking means comprises said wall tapering upwardly.

12. The system of claim 7, further comprising a support for suspending said system;
wherein said support comprises at least one clamp assembly mounted on said tube, and a set of braces connected to each respective said clamp assembly for suspending said tube.

13. The system of claim 12, wherein each said respective clamp assembly comprises:
two equal halves each having two ends and an outer side,
a flange for each said end, wherein said flanges of adjacent said ends form end brackets, respectively, and at least one bracket for each said side; and
wherein each said bracket of each said respective clamp assembly connects to an end of one of said braces, respectively, of said set connected thereto.

14. The system of claim 13, wherein said system delivers the material to a storage comprising a wall;
wherein said support suspends said system within the storage;
wherein said support further comprises wall brackets connected to said braces, respectively, for connecting to the storage wall; and
wherein said wall brackets each comprises parallel flanges for connecting to another end of one of said braces, respectively.

15. A system for delivering material being transported by a conveyor entraining the material within a flow of fluid, wherein said system comprises:
a separator; and
a tube for receiving the fluid flow entraining the material and for conveying the fluid flow entraining the material to said separator;
wherein said separator comprises:
an inlet for the fluid flow entraining the material from said tube,
means for separating the material from the fluid flow within said separator,
means for depositing the material from said separating means out of said separator wherein said depositing means comprises a first outlet,
a second outlet,
a wall interconnecting said first outlet and said second outlet, and
means for selecting either to separate the material from the fluid flow by said separating means and to deposit the material from said separating means by said depositing means or else to flow the fluid flow entraining the material through said separator through said second outlet without separation of the material from the fluid flow within said separator;
wherein said separating means comprises means for selectively separating the material from the fluid flow within said separator only when said selecting means is selecting to separate and to deposit;
wherein said selectively separating means comprises means for choking the fluid flow entraining the material within said separator to separate the material from the fluid flow within said separator;
wherein said choking means comprises said separator being vertically oriented with said second outlet being above said inlet and above said depositing means;
wherein said selecting means comprises said first outlet through which the material from said selectively separating means flows out of said separator;
wherein said inlet is above said first outlet;
wherein said inlet and said second outlet each has a diameter;
wherein said first outlet has a diameter greater than the diameters of said inlet and of said second outlet;
wherein said wall comprises a cylindrical base having a lower end that forms said first outlet; and
wherein said wall tapers upwardly from said cylindrical base to said second outlet and forms said second outlet.

16. The system of claim 15, wherein said depositing means further comprises a plurality of webs spacing apart said cylindrical base and said inlet.

17. A separator for separating material from a flow of fluid being transported by a conveyor entraining the material within the fluid flow, wherein said separator comprises:
an inlet for the fluid flow entraining the material;
means for separating the material from the fluid flow within said separator;
a first outlet for depositing the material from said separating means out of said separator;
a second outlet; and
a wall interconnecting said first outlet and said second outlet;
wherein said wall comprises:
a cylindrical base having an end that forms said first outlet, and
a forcing cone tapering from said cylindrical base to said second outlet and forming said second outlet.

18. The separator of claim 17, wherein said separating means comprises means for choking the fluid flow entraining the material within said separator to separate the material from the fluid flow within said separator.

19. A separator for separating material from a flow of fluid being transported by a conveyor entraining the material within the fluid flow, wherein said separator comprises:
an inlet for the fluid flow entraining the material;
means for separating the material from the fluid flow within said separator, wherein said separating means comprises means for choking the fluid flow entraining the material within said separator to separate the material from the fluid flow within said separator;
a first outlet for depositing the material from said separating means out of said separator;
a second outlet; and
a wall interconnecting said first outlet and said second outlet;
wherein said wall tapers from said first outlet to said second outlet.

20. A separator for separating material from a flow of fluid being transported by a conveyor entraining the material within the fluid flow, wherein said separator comprises:
an inlet for the fluid flow entraining the material;
means for separating the material from the fluid flow within said separator, wherein said separating means comprises means for choking the fluid flow entraining the material within said separator to separate the material from the fluid flow within said separator;
a first outlet for depositing the material from said separating means out of said separator;
a second outlet;
a wall interconnecting said first outlet and said second outlet; and
webs interconnecting said inlet and said wall;
wherein said webs are in said first outlet.

21. A separator for separating material from a flow of fluid being transported by a conveyor entraining the material within the fluid flow, wherein said separator comprises:

an inlet for the fluid flow entraining the material;
means for separating the material from the fluid flow within said separator, wherein said separating means comprises means for choking the fluid flow entraining the material within said separator to separate the material from the fluid flow within said separator;
a first outlet for depositing the material from said separating means out of said separator;
a second outlet;
a wall interconnecting said first outlet and said second outlet; and
webs in said second outlet interiorly of and connected to said wall.

22. A separator for separating material from a flow of fluid being transported by a conveyor entraining the material within the fluid flow, wherein said separator comprises:
an inlet for the fluid flow entraining the material;
means for separating the material from the fluid flow within said separator, wherein said separating means comprises means for choking the fluid flow entraining the material within said separator to separate the material from the fluid flow within said separator;
a first outlet for depositing the material from said separating means out of said separator;
a second outlet; and
an open mushroom-shaped cap at said second outlet for redirecting any of the fluid flow entraining the material, within said separator that flows through said second outlet, downwardly out of said separator;
wherein said open cap comprises a stem in said second outlet.

23. A separator for separating material from a flow of fluid being transported by a conveyor entraining the material within the fluid flow, wherein said separator comprises:
an inlet for the fluid flow entraining the material;
means for separating the material from the fluid flow within said separator, wherein said separating means comprises means for choking the fluid flow entraining the material within said separator to separate the material from the fluid flow within said separator;
a first outlet for depositing the material from said separating means out of said separator;
a second outlet;
a wall interconnecting said first outlet and said second outlet;
an open cap at said second outlet, wherein said open cap comprises a stem; and
webs at said second outlet interconnecting said wall and said stem of said open cap.

24. A method of delivering material being transported by a conveyor entraining the material within a flow of fluid, wherein said method comprises:
flowing the fluid flow entraining the material from a tube into an upstream separator, comprising an inlet, a first outlet, and a second outlet above the first outlet, through the inlet of the upstream separator;
separating the material from the fluid flow within the upstream separator;
depositing the material from said separating out of the upstream separator through the first outlet; and
selecting either to separate the material from the fluid flow by said separating and to deposit the material from said separating by said depositing or else to flow the fluid flow entraining the material through the upstream separator through the second outlet without separation of the material from the fluid flow within the upstream separator;
wherein said separating comprises selectively separating the material from the fluid flow within the upstream separator only when said selecting is selecting to separate and to deposit;
wherein said depositing forms a mound of the material; and
wherein said method further comprises only when said selecting is selecting to flow:
stopping said selectively separating and said depositing by said selecting to be selecting to flow;
reestablishing the fluid flow entraining the material through the upstream separator without separation of the material from the fluid flow within the upstream separator;
flowing the fluid flow entraining the material through the second outlet and through another tube and into a downstream separator that is downstream of and above the upstream separator;
separating the material from the fluid flow within the downstream separator; and
depositing the material, from said separating within the downstream separator, out of the downstream separator onto the mound of the material.

25. A system for delivering material being transported by a conveyor entraining the material within a flow of fluid, wherein said system delivers the material to a storage comprising a wall, wherein said system comprises:
a plurality of tubes vertically oriented within the storage for conveying downstream the fluid flow entraining the material;
a plurality of separators vertically oriented within the storage for separating the material from the fluid flow and for depositing the material from the separating into the storage forming a mound of the material having a surface, wherein each respective said separator comprises an inlet for the fluid flow entraining the material from a respective one of said tubes, means for separating the material from the fluid flow within said respective separator, means for depositing the material from said separating means out of said respective separator into the storage onto the mound wherein said depositing means comprises a first outlet, and a second outlet for flowing through any of the fluid flow entraining the material that flows through said respective separator to said second outlet thereof; and
a support vertically suspending said system within the storage, wherein said support comprises a plurality of clamp assemblies each mounted on any one of said tubes and a set of braces connected to each respective said clamp assembly for interconnecting said respective clamp assembly and the storage wall;
wherein at least one of said clamp assemblies is mounted on each of said tubes;
wherein said respective tube conveys the fluid flow entraining the material downstream into said respective separator vertically upwardly through said inlet thereof;
wherein said plurality of said separators comprises upstream and downstream said separators, wherein each respective said upstream separator is immediately upstream of and below one of said downstream separators and each respective said downstream separator is immediately downstream of and above one of said upstream separators, and wherein said plurality of said separators comprises at least one said upstream separator and at least one said downstream separator; and wherein said tube that conveys the fluid flow entraining the material downstream into said downstream separator through said inlet thereof, respectively, also conveys downstream the fluid flow entraining the material that is from said immediately upstream separator vertically upwardly through said second outlet thereof, respectively.

26. The system of claim 25, wherein each said respective upstream separator further comprises means for selecting either to separate the material from the fluid flow by said separating means thereof and to deposit the material from said separating means thereof by said depositing means thereof or else to flow the fluid flow entraining the material through said respective upstream separator through said second outlet thereof without separation of the material from the fluid flow within said respective upstream separator;

wherein said separating means of each said respective upstream separator comprises means for selectively separating the material from the fluid flow within said respective upstream separator only when said selecting means thereof is selecting to separate and to deposit; and wherein said tube that conveys the fluid flow entraining the material downstream into said downstream separator through said inlet thereof, respectively, also conveys the fluid flow entraining the material downstream from said immediately upstream separator through said second outlet thereof, respectively, only when said selecting means thereof is selecting to flow;

whereby said system sequentially fills the storage as initially each said respective upstream separator is selectively separating the material by said selectively separating means thereof and is depositing the material, from said selectively separating means thereof, by said depositing means thereof onto the mound until said selecting means thereof is selecting to flow, and then subsequently each said respective downstream separator is separating the material by said separating means thereof and is depositing the material, from said separating means thereof, by said depositing means thereof onto the mound.

27. The system of claim 26, wherein said selecting means of each said respective upstream separator comprises means for automatically selecting either to separate the material from the fluid flow by said selectively separating means thereof and to deposit the material from said selectively separating means thereof by said depositing means thereof or else to flow the fluid flow entraining the material through said respective upstream separator through said second outlet thereof without separation of the material from the fluid flow within said respective upstream separator; and wherein said automatically selecting means of each said respective upstream separator comprises said first outlet thereof through which the material from said selectively separating means thereof flows out of said respective upstream separator, forming the mound of the material so that said automatically selecting means thereof is selecting to separate and to deposit, only until the surface of the mound blocks said first outlet thereof so that said automatically selecting means thereof is selecting to flow;

whereby said system automatically sequentially fills the storage as initially each said respective upstream separator is selectively separating the material by said selectively separating means thereof and is depositing the material, from said selectively separating means thereof, by said depositing means thereof onto the mound until the surface of the mound blocks said first outlet thereof so that said automatically selecting means thereof is selecting to flow, and then subsequently each said respective downstream separator is separating the material by said separating means thereof and is depositing the material, from said separating means thereof, by said depositing means thereof onto the mound.

28. The system of claim 27, wherein:
said plurality of said separators comprises at least three said separators of said plurality thereof;
one of said upstream separators is upstream of all of said downstream separators;
one of said downstream separators is downstream of all of said upstream separators; and
all others of said separators of said plurality thereof are simultaneously one of said upstream separators, that is not said one upstream separator that is upstream of all of said downstream separators, and one of said downstream separators, that is not said one downstream separator that is downstream of all of said upstream separators.

29. The system of claim 28, further comprising:
a horizontal tube within the storage entering therein through the storage wall for conveying downstream from the conveyor the fluid flow entraining the material toward said plurality of said vertically oriented tubes and said plurality of said vertically oriented separators; and
an elbow for directing the fluid flow entraining the material from said horizontal tube into said respective tube that conveys the fluid flow entraining the material downstream through said inlet of said one upstream separator that is upstream of all of said downstream separators.

30. The system of claim 29, further comprising an open cap in said second outlet, of said one downstream separator that is downstream of all of said upstream separators, for redirecting any of the fluid flow entraining the material that flows through said second outlet, of said one downstream separator that is downstream of all of said upstream separators, downwardly into the storage.

* * * * *

UNITED STATES PATENT AND TRADEMARK OFFICE
CERTIFICATE OF CORRECTION

PATENT NO. : 10,106,338 B2  
APPLICATION NO. : 13/999396  
DATED : October 23, 2018  
INVENTOR(S) : Douglas Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this  
Twenty-eighth Day of January, 2020

Andrei Iancu  
*Director of the United States Patent and Trademark Office*